(12) United States Patent
Harriman (10) Patent No.: US 8,218,580 B2
(45) Date of Patent: Jul. 10, 2012

(54) MANAGING TIMING OF A PROTOCOL STACK

(75) Inventor: David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 12/218,410

(22) Filed: Jul. 15, 2008

(65) Prior Publication Data

US 2010/0014541 A1    Jan. 21, 2010

(51) Int. Cl.
    *H04J 3/06* (2006.01)
(52) U.S. Cl. .................................................. 370/517
(58) Field of Classification Search .................. 370/350,
        370/503–520; 710/118, 125, 305, 314, 315
    See application file for complete search history.

(56) References Cited

U.S. PATENT DOCUMENTS

| | | | |
|---|---|---|---|
| 5,440,545 A | 8/1995 | Buchholz et al. | 370/426 |
| 5,758,070 A * | 5/1998 | Lawrence | 709/220 |
| 5,958,064 A | 9/1999 | Judd et al. | 714/4 |
| 6,009,488 A | 12/1999 | Kavipurapu | 710/105 |
| 6,549,964 B1 | 4/2003 | Lai et al. | |
| 7,152,198 B2 | 12/2006 | Kajita | 714/758 |
| 7,353,313 B2 | 4/2008 | Wehage et al. | 710/305 |
| 7,680,943 B2 * | 3/2010 | Conta et al. | 709/230 |
| 7,751,423 B2 * | 7/2010 | Hottinen et al. | 370/437 |
| 2002/0073257 A1 | 6/2002 | Beukema et al. | |
| 2005/0060470 A1 * | 3/2005 | Main et al. | 710/305 |
| 2005/0114577 A1 * | 5/2005 | Beckhoff et al. | 710/110 |
| 2006/0019662 A1 * | 1/2006 | Andrews et al. | 455/435.3 |
| 2006/0101178 A1 | 5/2006 | Zhong et al. | |
| 2006/0236017 A1 * | 10/2006 | Rooholamini et al. | 710/316 |
| 2007/0047580 A1 * | 3/2007 | Sachs et al. | 370/469 |
| 2008/0273521 A1 * | 11/2008 | Shao et al. | 370/350 |
| 2008/0320190 A1 | 12/2008 | Lydon et al. | |
| 2009/0238106 A1 * | 9/2009 | Ulupinar et al. | 370/312 |

FOREIGN PATENT DOCUMENTS

| | | |
|---|---|---|
| EP | 1 758 302 A1 | 2/2007 |
| WO | WO 98/47256 | 10/1998 |
| WO | WO 01/13564 | 2/2001 |
| WO | WO 03/019391 | 6/2003 |
| WO | WO 2005/117352 A1 | 12/2005 |
| WO | WO 2006120590 | 11/2006 |

OTHER PUBLICATIONS

U.S. Appl. No. 12/009,970, filed Jan. 23, 2008, entitled "Enabling Flexibility of Packet Length in a Communication Protocol", by Mahesh Wagh.

UK Intellectual Property Office, UK Search Report under Section 17(5) Dated Oct. 1, 2009 in related patent application No. 0912137.7.

(Continued)

*Primary Examiner* — Ricky Ngo
*Assistant Examiner* — Eric Kao
(74) *Attorney, Agent, or Firm* — Trop, Pruner & Hu, P.C.

(57) ABSTRACT

A method includes receiving a communication in a protocol stack coupled to a tunneling interconnect, determining whether a communication type is subject to altered timing to accommodate a delay associated with the tunneling interconnect, adjusting a timing of at least one stack logic to accommodate the delay, and handling the communication using the adjusted timing. Other embodiments are described and claimed.

17 Claims, 4 Drawing Sheets

OTHER PUBLICATIONS

German Patent Office, Office Action for corresponding German Application No. 10 2009 032 581.6, dated May 7, 2010, 10 pgs.
German Patent Office, Office Action mailed Feb. 7, 2011 in German application No. 10 2009 032 581.6-53.
State Intellectual Property Office, P.R. China, Office Action issued Jun. 17, 2011 in Chinese application No. 200910164607.
Japanese Patent Office, Office Action dated Jun. 28, 2011 in Japanese application No. 2009-165061.

* cited by examiner

MANAGING TIMING OF A PROTOCOL STACK

BACKGROUND

Computer platforms typically include a number of semiconductor components that are coupled by way of various interconnects. These interconnects or links are often of different protocols such that communication on the different links occurs at different speeds and according to different protocols. In some systems, communications of an input/output (IO) protocol can be tunneled over another interconnect. Tunneling generally involves taking communications according to a first protocol and providing them through an interconnect that operates according to a second protocol such that the packets of the first protocol are tunneled, e.g., by way of applying a header of the second protocol to packets of the first protocol and sending them along the interconnect. Typically, such protocol tunneling occurs at a very high level such that while the two protocols may have the same software abstraction, there is no shared hardware between the protocols. Thus there is minimal advantage to such tunneling in terms of software compatibility, performance and time to market.

DETAILED DESCRIPTION

In various embodiments, one or more existing IO protocols can be tunneled at a relatively low level over another interconnect, referred herein as the tunneling interconnect. In one embodiment, a converged IO (CIO) may be an example of such an interconnect, which can be used to tunnel communications of a Peripheral Component Interconnect Express (PCIe) protocol in accordance with the PCI Express™ Specification Base Specification version 2.0 (published Jan. 17, 2007) (hereafter the PCIe™ Specification), or another such protocol as well as other protocols. For CIO, much of the PCIe hardware stack is directly implemented, which provides advantages in software compatibility, performance and time to market. That is, in low level tunneling, most of the tunneled protocol stack is implemented. In contrast, for high level tunneling, the software architecture is preserved, but without necessarily using the packet, encoding or wire protocol mechanisms from the tunneled protocol. Via this low level tunneling, packets of the PCIe protocol stack can be tunneled through the CIO interconnect, e.g., by adaptation of a CIO header to the tunneling packets. When such a transmitted tunneled packet is received in a receiver, the CIO protocol stack of the receiver can decode the header and pass along the PCIe packets to a corresponding PCIe protocol stack of the receiver.

However, such an approach to a converged interconnect introduces a problem via this low level tunneling, in contrast to tunneling protocols that occur at higher levels of abstraction. Namely, there are often protocol timing constraints, some implicit, which are trivially satisfied in a non-tunneled, native instantiation of the interconnect protocol, but which can be more difficult to manage when tunneling the interconnect protocol due to the introduction of delays by the interconnect used for tunneling. These delays may be caused by the tunneling interconnect itself or by traffic from other tunneled protocols.

Embodiments provide a mechanism for managing explicit and implicit timers of a tunneled protocol when tunneling over a tunneling interconnect. While an embodiment described herein uses an example of a tunneled PCIe protocol over a CIO, it is to be understood the scope of the present invention is not limited in this regard and the same principles can be applied to other tunneled interconnects, and other interconnects used for tunneling, including both wired and wireless interconnects.

Timing requirements of an interconnect, both explicit and implicit, can be divided into two broad categories, referred to herein as link and wall clock time requirements. Link timing requirements are associated with lower levels such as link protocols, and generally exist to ensure smooth link operation and minimize validation corner cases. Wall clock timing requirements are associated with events that are observable at higher levels, e.g., to operating system (OS) and application software. Link timing requirements can be directly impacted by delays caused by protocol tunneling, and are the requirements addressed by embodiments. Typically, link timing requirements may be on the order of less than approximately 10 microseconds (µs), while wall timing requirements are greater than approximately 10 microseconds (µs). Wall clock requirements are not fundamentally affected by protocol tunneling because they are generally associated with time values long enough (e.g., milliseconds (ms)) to be unaffected by the relatively short delays caused by protocol tunneling (e.g., microseconds), and furthermore these requirements are associated with properties such preventing user visible stalls to application software that are equally desirable regardless of the hardware mechanisms (native vs. tunneled) used to convey a particular interconnect protocol.

Table 1 below lists a number of timing requirements associated with PCIe, and showing how each is relevant to this discussion. Note that the quotes in the Description portion are taken from the PCI Express™ Specification.

TABLE 1

| Description | Type | Notes |
| --- | --- | --- |
| Acknowledgment/Non-acknowledgement (Ack/Nak) Transmission and Replay Timer | Link | Firm requirement—A (spurious) error will be triggered if time requirements not satisfied by the tunneling interconnect |

TABLE 1-continued

| Description | Type | Notes |
|---|---|---|
| Link state zero standby (L0s) Invocation Policy: "Ports . . . must transition their Transmit Lanes to the L0s state if the defined idle conditions (below) are met for a period of time not to exceed 7 µs." | Link | Triggers link power management when link not in use; this is an example of a case where time is counted according to tunneling interconnect allocation rather than what was actually used |
| Link State 1 (L1) Entry Negotiation— "Upstream component sends this DLLP repeatedly with no more than four Symbol times of idle" | Link | An implicit timing requirement. In this case, the appearance of the traffic to the PCIe stack is managed, masking inserted delays |
| Flow Control Updates | Link | Guideline, not requirement |
| PCI-power management (PM) & active state power management (ASPM): "Upon exit from L1, it is recommended that the Downstream component send flow control update data link layer packets data link layer packets (DLLPs) for all enabled virtual channel (VCs) and flow control (FC) types starting within 1 µs of L1 exit." | Link | Guideline, not requirement |
| L0s/L1 Exit Latencies | Wall Clock | These timing parameters exist to allow determination of impact to traffic over PCIe, not as fundamental PCIe link operations |
| Power management event (PME)—"If after 100 ms (+50%/−5%), the PME_Status bit of a requesting agent has not yet been cleared, the PME Service Timeout mechanism expires triggering the PME requesting agent to re-send the temporarily lost PM_PME Message." | Wall Clock | Requirement exists to prevent PMEs from being completely lost; the specific time was chosen to minimize spurious triggering while at the same time being short enough that the PME would still be processed in a relatively timely manner |
| Posted Request Acceptance Limit of 10 us | Wall Clock | Intended to limit platform observable delays caused by fabric congestion |
| Flow Control min update frequency of 30 us & Update FCP timer—200 us | Wall Clock | Intended to limit stalls caused by loss of Flow Control packet |

Note that Table 1 is intended to illustrate some examples of interest, but is not intended to be a complete list of all timing related requirements in PCIe.

The link timing requirements are "measured" by the PCIe stack itself, thus if the PCIe stack's view of time is changed, the way these times will be perceived can be altered. To achieve this, a mechanism by which time altering is achieved may be provided, along with hardware, software or firmware to determine when and how to alter the stack timing.

The mechanism for altering the PCIe stack's view of time can be done in a number of ways. This can be done by, for example, gating or turning off the clocks to various elements in the PCIe stack logic, which effectively makes time stand still for that logic. Note that this approach has the additional benefit of reducing power consumed by the PCIe stack logic when it is not in use. In other embodiments, an explicit control signal can be added to the PCIe stack logic indicating when time should be counted. Note that it will not generally be sufficient to control the entire stack as one unit, but rather sub-elements of the stack can be semi-independently controlled, because different protocol mechanisms can impact different logic blocks differently. Similarly, not all communications will need to have timing altered in order to comply with the link timing requirements. In one embodiment, control logic can be used to determine when and how to adjust the PCIe stack's view of time, and this logic may be part of a PCIe stack.

Figure 1:
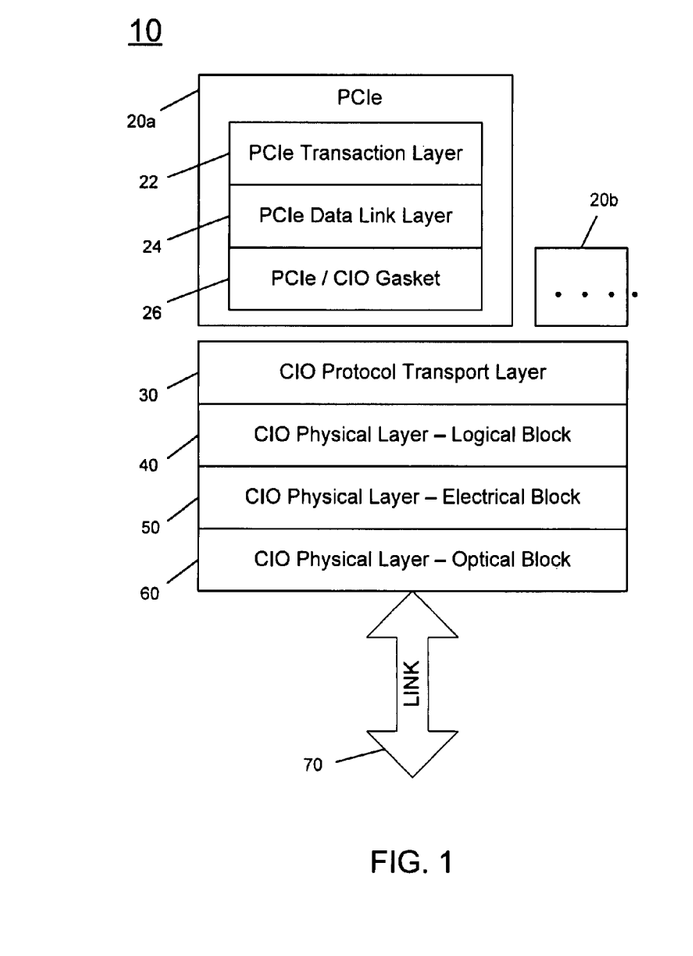
FIG. 1 is a block diagram of a connection of a protocol stack to a link via a shared physical layer in accordance with one embodiment of the present invention.

Referring now to FIG. 1, shown is a block diagram of how the PCIe stack (and other tunneled protocols) are interfaced to a shared tunneling link, which in one embodiment can be a CIO link. As shown in FIG. 1, a system 10 includes a first stack 20$_a$ and a second stack 20$_b$ (generically protocol stack 20). In one embodiment, first protocol stack 20$_a$ may be a PCIe stack, while second protocol stack 20$_b$ may be a universal serial bus (USB), a display interconnect, or other such protocol stack. For ease of illustration, only details of the PCIe protocol stack are shown. Specifically, protocol stack 20$_a$ includes a transaction layer 22, a data link layer 24, and an interface or gasket layer 26, which acts as an interface between the PCIe protocol and the tunneling protocol. Details of the operation of such interface logic will be discussed further below.

As further shown in FIG. 1, a converged IO layer may be coupled between first and second protocol stacks 20 and a link 70 which, in one embodiment may be an optical link, an electrical link or other such link. As shown in FIG. 1, the CIO protocol stack may include a CIO protocol transport layer 30, a logical block 40 of a physical layer, an electrical block 50 of the physical layer, and an optical block 60 of the physical layer. In this way, blocks 40-60 act as a shared physical layer than can be shared by multiple protocols in communication with the physical layer to thus tunnel information of these multiple protocols along link 70.

Figure 2:
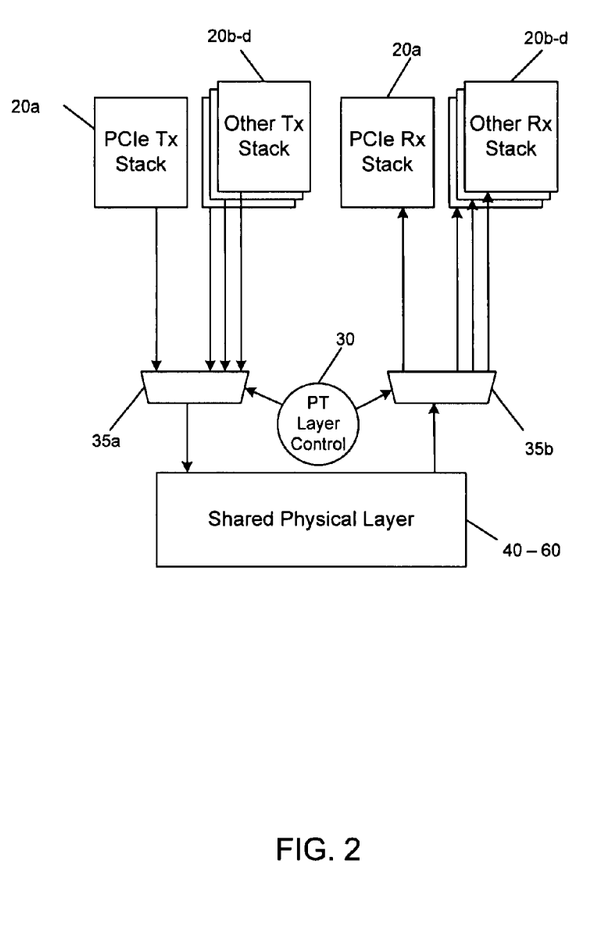
FIG. 2 is a block diagram of a system having multiple communication stacks coupled to a shared physical layer in accordance with another embodiment of the present invention.

Referring now to FIG. 2, shown is a representation of a system having multiple communication stacks coupled to a shared physical layer. Specifically, in FIG. 2 in addition to PCIe transmit (TX) and receive (RX) stacks 20$_a$, multiple other transmit and receive stacks 20$_b$-20$_d$ may be present. As shown, a pair of multiplexers 35$_a$ and 35$_b$ (generically multiplexers 35) may be coupled between these stacks and a shared physical layer 40-60. Multiplexers 35 may be operated under control of protocol transport layer control 30. As shown in FIG. 2, CIO protocol transport (PT) layer 30 implements the multiplexing (via multiplexers 35$_a$ and 35$_b$) and control mechanisms to tunnel PCIe and other protocols. The PT layer control 30 implements arbitration for the transmitter and steering for the receiver, which is independent of the transmitter. While this type of structure is used for the remainder of this discussion, it is noted that embodiments can be applied to other types of interconnects that control the transmitter and receiver differently, for example, by arbitrating for both at the same time, or by having a single bi-directional connection.

Different manners of implementing timing control of an interconnect can be realized in different embodiments. For example, in some implementations a dynamic late binding may occur such that such an interface logic can dynamically determine a tunneling interconnect to which it is to be coupled and to dynamically control any timing requirements of the protocol to accommodate the tunneling interconnect. In other embodiments, a designer may determine during system development a tunneling interconnect to be used by one or more protocol stacks, such that the link timing requirements that may be affected by the tunneling interconnect can be determined during system design. Thus logic can be incorporated, e.g., in interface logic, between the protocol stack and the tunneling interconnect to control the timing of the protocol stack, such as by altering the protocol stack's timing view, to accommodate any additional delays incurred via the tunneling interconnect.

Figure 3:
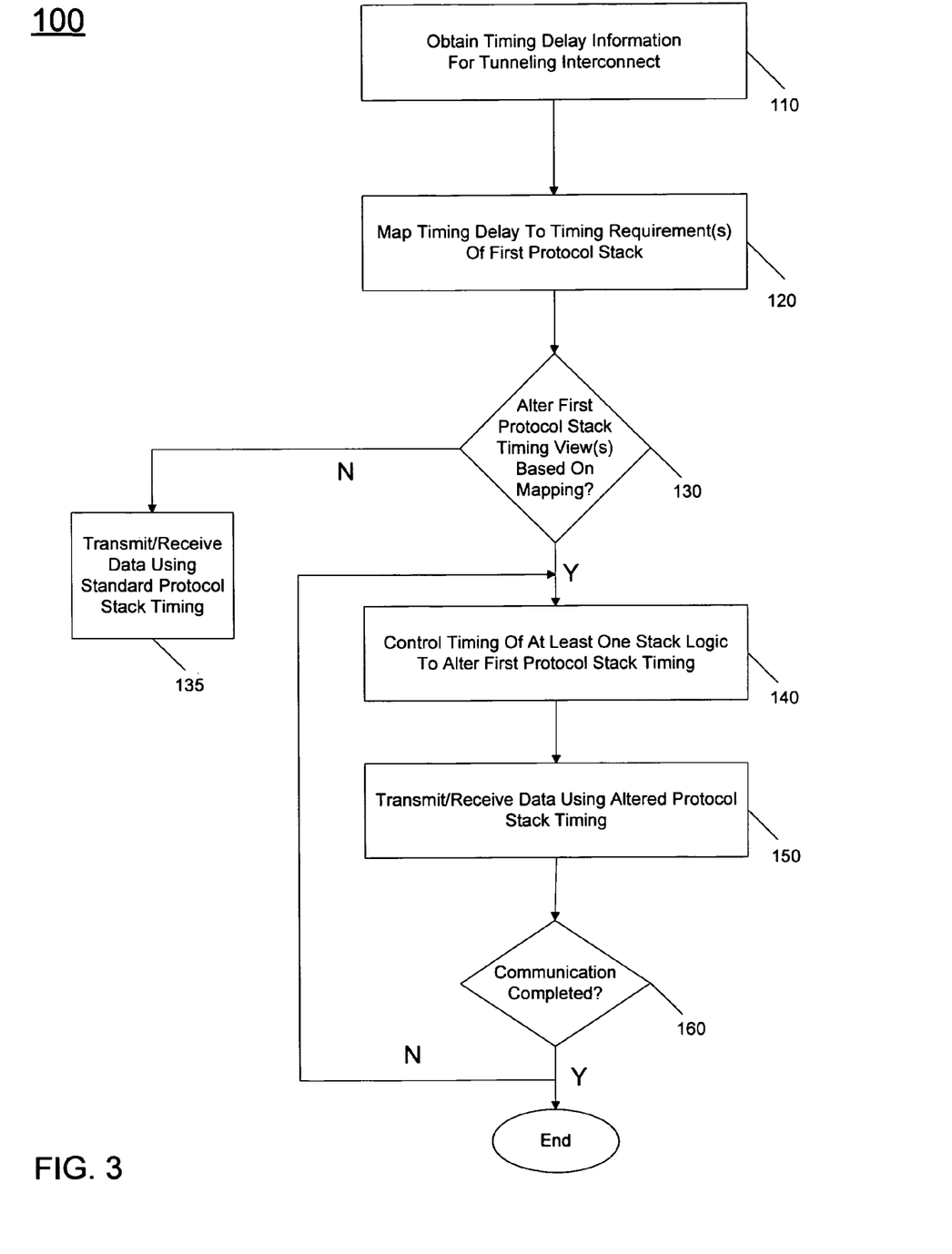
FIG. 3 is a flow diagram of a method in accordance with one embodiment of the present invention.

Referring now to FIG. 3, shown is an implementation of the former manner of handling link timing requirements, namely a dynamic late binding that may be implemented via the interface logic itself such that the protocol stack can be dynamically coupled to a shared physical layer or another physical layer. Specifically, FIG. 3 shows a flow diagram of a method 100 that can be implemented in, e.g., interface logic of a protocol stack for communication between the protocol stack (which may be a standard stack of a given protocol) and a common physical layer such as a converged interconnect that can tunnel packets of various protocols. As shown in FIG. 3, method 100 may begin by obtaining timing delay information for the tunneling interconnect (block 110). Various manners of obtaining this information may be implemented. For example, in one embodiment a shared physical layer may provide a predetermined listing of delay information to the interface logic. Alternately, the interface logic may analyze packet communications occurring with the shared physical layer to determine the timing delay information. More generally, some embodiments may obtain the timing information in a predetermined manner, while other implementations may dynamically compute such information. There can be several variations on each, e.g., a human vs. machine pre-determination, or for the computed case, one can perform the check one time or repeat it periodically. Note that various instances of such information may exist, where different delays occur for different types of communications, depending upon the nature of the communication and the logic entities involved.

Referring still to FIG. 3, control passes to block 120, where the timing delay information may be mapped to timing requirements of the first protocol stack. As one example, a protocol stack may have varying timing requirements with regard to link layer communications, such as set forth above in Table 1. Control then passes to diamond 130 where it may be determined whether a timing view or views of the first protocol stack need to be altered based on the mapping. That is, because of latencies that may be present in the common physical layer, one or more timers associated with given logic of the protocol stack can be controlled, e.g., via speeding up, slowing down, disabling and so forth. If no such altering of the timing view is needed, control passes to block 135 where data may be transmitted and/or received using the standard protocol stack timing.

Referring still to FIG. 3, if instead that it is determined that the timing view should be altered, control passes to block 140 where the timing of at least one stack logic may be controlled to alter the first protocol stack timing. As mentioned, this altering of timing may be done via control of timers, controlling of logic to count a given interval (or not) or so forth. After such timing control has been performed, desired data may be transmitted/received using this altered protocol stack timing (block 150). As shown further in FIG. 3, it may then be determined whether a communication, i.e., a given transaction, has been completed (diamond 160). If so, the method may conclude. Alternately, control passes back for a repeated iteration of blocks 140 and 150. While shown with this particular implementation in the embodiment of FIG. 3, the scope of the present invention is not limited in this regard.

For example, in other implementations a system design may be fixed such that a given protocol stack is to be tunneled over a known tunneling interconnect having known delays. Accordingly during system design, logic can be implemented to handle control of timing of various protocol transactions as needed to accommodate for any delays inherent in the tunneling interconnect. Table 1 above provides examples of such link layer timing requirements.

Figure 4:
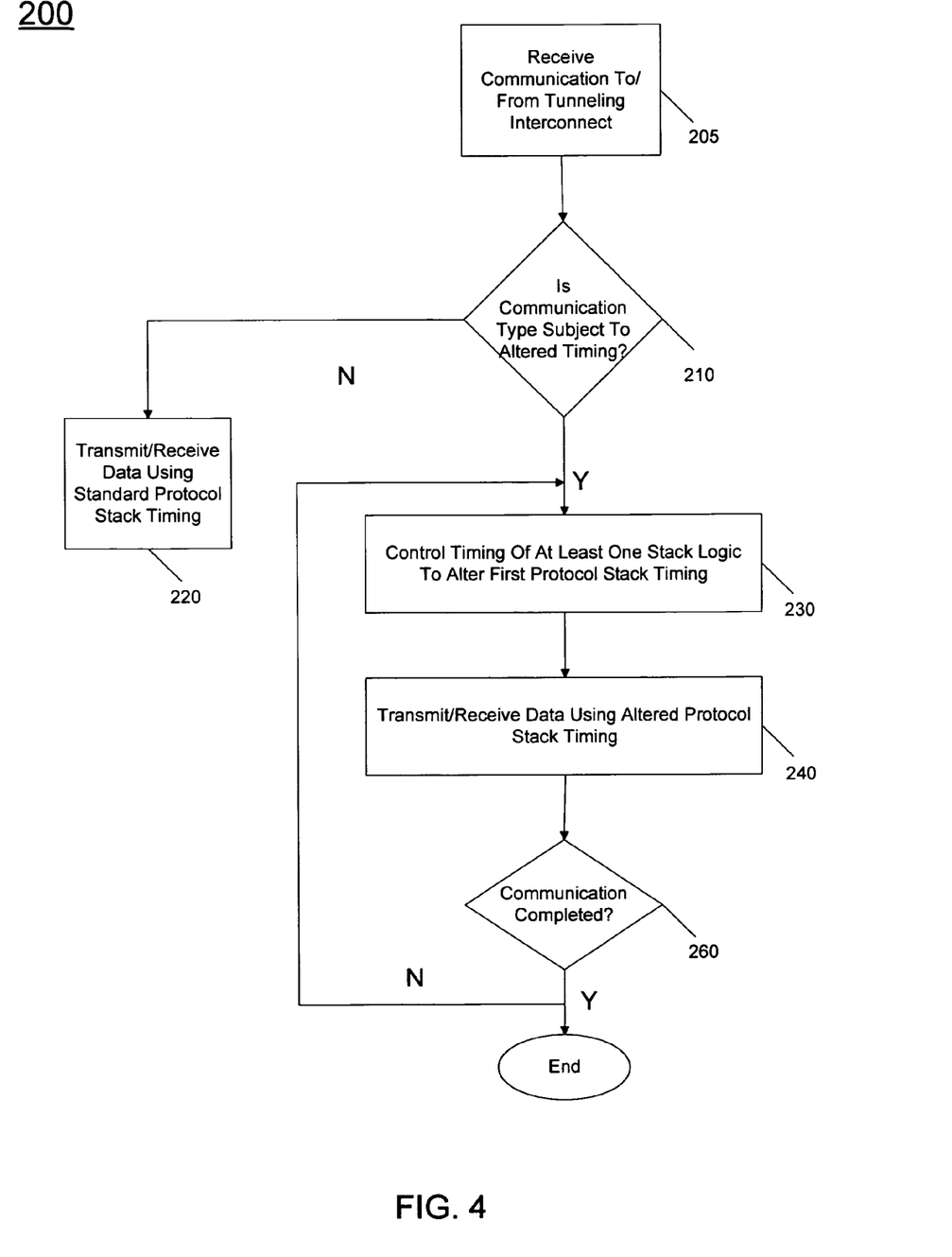
FIG. 4 is a flow diagram of a method of operating an interface of a protocol stack in accordance with another embodiment of the present invention.

Referring now to FIG. 4, shown is a flow diagram of a method of operating an interface of a protocol stack in accordance with another embodiment of the present invention. As shown in FIG. 4, method 200 may be implemented by interface logic that can alter a protocol stack's timing view as needed, based on static design parameters. As shown in FIG. 4, method 200 may begin by receiving a communication to/from a tunneling interconnect (block 205). This communication is thus received in interface logic of the protocol stack in an outgoing or incoming direction. Various communication types may be handled in the interface logic, including transmission and receipt of data packets, as well as various protocol packets such as acknowledgements, control packets such as for power management, flow control and so forth.

Based on the type of packet, it may be determined in the interface logic whether a given communication type is subject to altered timing (diamond 210). For example, the interface logic may include or may be associated with a table (such as present in a non-volatile memory) that identifies transaction types and whether a timing view of the protocol stack should be altered for that type of communication, along with an indication of the delay that is applicable, and an instruction or other identifier of the type of control measure to be applied by the interface logic to alter the timing accordingly. Note that multiple portions may be present in the table, with each portion associated with a given stack, such that each portion provides mappings for a dedicated stack-tunneling interconnect relationship.

Referring still to FIG. 4, if no altering is needed, the standard protocol stack timing may be used to handle the communication, and thus the data may be transmitted/received using the standard protocol stack timing (block 220). If instead it is determined that the timing view should be altered, control passes to block 230 where the timing of at least one stack logic may be controlled to alter its timing. Then desired data may be transmitted/received using this altered protocol stack timing (block 240). As shown further in FIG. 4, it may then be determined whether a communication, i.e., a given transaction, has been completed (diamond 260). If so, the method may conclude. Alternately, control passes back for a repeated iteration of blocks 230 and 240. Thus static control of handling link timing requirements can be realized.

As shown in the above FIGS. 3 and 4, timing control can be altered for certain communication types, while other communication types can proceed according to their normal protocol stack timing without alteration. The following discussion provides some examples of situations in which a protocol stack's timing may be altered to accommodate link timing requirements.

In one embodiment, PT layer control 30 can provide transmitter "slots" which are allocated to PCIe, but which can be used for other types of traffic if no PCIe traffic is present to be transmitted. Thus a slot allocated for a first protocol stack can be used by another protocol stack if the first protocol stack has nothing to transmit. Likewise, at a receiver, there may be times where PCIe traffic would be received, but because the other component either did not have PCIe traffic to transmit or because it had higher priority traffic of a different type, the receiver does not receive any PCIe traffic during that time.

To correctly convey the notion of "PCIe time" to the PCIe stack, receive and transmit times can be considered somewhat independently. In some cases described in Table 1, such as the L0s Invocation Policy and the "Upon exit from L1 . . . " requirements, the time is measured from only one point of view (in these cases, the transmitter's).

However, for the Ack/Nak protocol, both receiver and transmitter points of view need to be considered. The PCIe transmitter's view of the time a transaction layer packet (TLP) was transmitted may be incorrect if it assumes a particular latency to travel through the transmission pipeline that is based on a physical PCIe port, if the CIO transmit pipeline has a different delay. The other (i.e., receiver) component is only able to respond when its PCIe stack has been allocated PCIe time on the shared link, which is perceived by the receiver as needing an adjustment to its (receiver's) view of time. Suppose the PCIe stack expects a transmission pipeline delay of 50 nanoseconds (ns), but the CIO link provides a transmission pipeline delay of 70 ns. In this case, it would be necessary to stall or otherwise adjust the transmitter's time view (for protocol aspects that depend on knowing this delay) by 20 ns to account for the difference. Thus, a transmitter will wait a proper time interval for an ACK signal from a receiver (which may be delayed by the shared physical layer) so that an error signal is not improperly raised.

For a receiver, it must account for the allocated time (not used time) that the other component's transmitter provided for PCIe. In some cases, this will be directly known to the receiver, however in other cases a tunneling protocol mechanism, such as a message may be provided to indicate how much the other component's receiver should advance the time view for each tunneled protocol. For example, if two 100 ns slots are allocated to a PCIe transmitter, but only one is used by the transmitter due to a lack of PCIe traffic to transmit, then the receiver must account for 200 ns of time. In this way, if the other component violates a timing rule by not taking advantage of a slot that was available for transmission, the violation is visible to the receiver. This would not be the case if only transmission slots used (vs. allocated) were accounted for.

Note that a variety of optimizations may be possible for certain protocols. For example, known bandwidth traffic may be accounted for using a counter mechanism, without regard to the link arbitration actually granted. Where a protocol has receive and transmit allocations guaranteed to be equal, it is possible to consider only one (e.g., the transmitter) with the comprehension that the other's (receiver's) time view must match.

As noted earlier, embodiments are not in any way dependent on the particulars of CIO or PCIe, and may apply to other protocols being tunneled such as display, USB, network, etc. Embodiments also apply to other tunneling protocols/environments, for example, tunneling PCIe over a wired or wireless USB interconnect.

By performing tunneling in accordance with an embodiment of the present invention, a larger number of distinct IO applications can be satisfied by a common set of more generic hardware. For example, a platform may include 12 USB ports, 8 PCIe ports, and a variety of special purpose ports (e.g., display). Through tunneling, these ports can be converged, for example, into a set of 16 converged ports, each one of which can be used as any one (or multiple) of the older ports.

Figure 5:
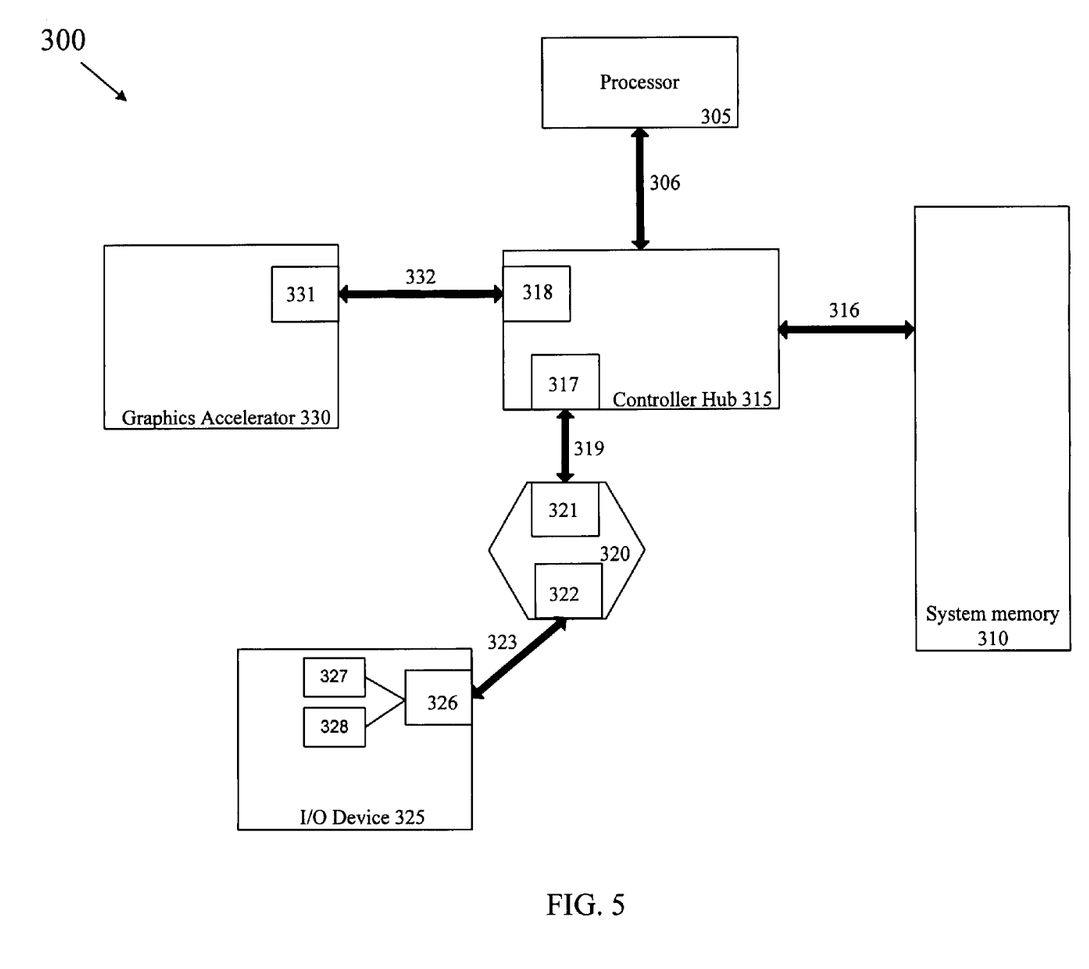
FIG. 5 is a block diagram of a system in accordance with one embodiment of the present invention.

Embodiments can be implemented in many different system types. Referring to FIG. 5, a block diagram of a system in accordance with one embodiment of the present invention includes devices coupled to a controller hub via a tunneling interconnect that is a serial link. System 300 includes a processor 305 and a system memory 310 coupled to a controller hub 315. Processor 305 includes any processing element, such as a microprocessor, a host processor, an embedded processor, a co-processor, or other processor. Processor 305 is coupled to controller hub 315 through a front-side bus (FSB) 306. In one embodiment, FSB 306 is a serial point-to-point (PtP) interconnect.

System memory 310 includes any memory device, such as random access memory (RAM), non-volatile (NV) memory, or other memory accessible by devices in system 300. System memory 310 is coupled to controller hub 315 through a memory interface 316.

In one embodiment, controller hub 315 is a root hub or root controller in a PCIe interconnection hierarchy. Examples of controller hub 315 include a chipset, a memory controller hub (MCH), a northbridge, an input/output controller hub (ICH) a southbridge, and a root controller/hub. Here, controller hub 315 is coupled to a switch/bridge 320 through a serial link 319. Input/output modules 317 and 321, which may also be referred to as interfaces/ports 317 and 321, include/implement a layered protocol stack to provide communication between controller hub 315 and switch 320. In one embodiment, multiple devices are capable of being coupled to switch 320.

Switch 320 routes packets/messages from a device 325 upstream, i.e., up a hierarchy towards controller hub 315 and downstream, i.e., down a hierarchy away from controller hub 315 to device 325. IO modules 322 and 326 implement a layered protocol stack to communicate between switch 320 and device 325. In one embodiment, IO module 326 may be a tunneling physical layer to tunnel packets of multiple protocol stacks namely stacks 327 and 328. Device 325 includes any internal or external device or component to be coupled to an electronic system, such as an IO device, a network interface controller (NIC), an add-in card, an audio processor, a network processor, a hard-drive, a storage device, a monitor, a printer, a mouse, a keyboard, a router, a portable storage device, a Firewire device, a Universal Serial Bus (USB) device, a scanner, and other input/output devices.

A graphics accelerator 330 is also coupled to controller hub 315 through serial link 332. In one embodiment, graphics accelerator 330 is coupled to an MCH, which is coupled to an ICH. Switch 320, and accordingly IO device 325, is then coupled to the ICH. IO modules 331 and 318 are also to implement a layered protocol stack to communicate between graphics accelerator 330 and controller hub 315.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a first protocol stack to handle data according to a first protocol, the first protocol stack including an interface logic to interface the first protocol stack to a tunneling interconnect; and
    the tunneling interconnect to couple the first protocol stack to a link and having a timing delay associated therewith, wherein the interface logic is to map timing delay information associated with the timing delay to a timing requirement of at least one stack logic of the first protocol stack, determine whether to alter a timing view of the first protocol stack based at least in part on the mapping, and control at least one timer of the first protocol stack based at least in part on the timing delay.

2. The apparatus of claim 1, wherein the interface logic is to dynamically map the timing delay information to the timing requirement, wherein the first protocol stack can be dynamically bound to the tunneling interconnect or to a second physical layer.

3. The apparatus of claim 1, wherein the interface logic is to disable a first clock of the first protocol stack for a predetermined time, the first clock to provide a first clock signal to a first stack logic, such that the first stack logic meets a link timing requirement of the first protocol.

4. The apparatus of claim 3, wherein the tunneling interconnect is to tunnel packets of the first protocol to the link via a protocol of the tunneling interconnect.

5. The apparatus of claim 1, wherein the link is a converged interconnect to be shared by the first protocol stack and a second protocol stack, wherein the first protocol stack is a Peripheral Component Interconnect Express™ (PCIe) stack.

6. The apparatus of claim 5, wherein the tunneling interconnect is to allocate first and second slots to the first protocol stack and a third slot to the second protocol stack.

7. The apparatus of claim 6, further comprising a receiver coupled to the link to receive the tunneled packets, wherein the receiver is to account for the allocated first and second slots via an interface logic coupled to the link.

8. A method comprising:
    receiving a communication in an interface logic of a first protocol stack of a transmitter coupled to a tunneling interconnect;
    accessing a table based on a communication type of the communication to obtain timing delay information for the tunneling interconnect associated with the communication type;
    determining whether the communication type of the communication is subject to altered timing to accommodate a delay associated with the tunneling interconnect based on the timing delay information;
    adjusting a timing of at least one stack logic of the first protocol stack to accommodate the delay; and
    handling the communication in the first protocol stack using the adjusted timing to communicate a message from the transmitter to a receiver coupled to the transmitter via the tunneling interconnect.

9. The method of claim 8, wherein the table is stored in non-volatile memory, and includes a first portion including mappings between the tunneling interconnect and the first protocol stack and a second portion including mappings between the tunneling interconnect and a second protocol stack coupled to the tunneling interconnect.

10. The method of claim 9, further comprising sharing the tunneling interconnect between the first protocol stack and the second protocol stack, and providing a slot of the first protocol stack to the second protocol stack if the first protocol stack does not have information to communicate during the slot.

11. The method of claim 8, wherein the timing of the at least one stack logic is adjusted by turning off a clock coupled to the at least one stack logic.

12. The method of claim 11, further comprising delaying a clock for a second stack logic based at least in part on the delay.

13. The method of claim 12, further comprising delaying the clock to prevent an error signal to indicate non-receipt of an acknowledgement from a receiver until after a predetermined time.

14. A system comprising:
    a transmitter including a physical layer coupled to a link and a protocol stack coupled to the physical layer;
    a receiver coupled to the transmitter via the link and including a first protocol stack to handle data according to a first protocol, the first protocol stack including a first interface logic to interface the first protocol stack to the link via a tunneling physical layer having a timing delay associated therewith, wherein the first interface logic is to alter timing of at least one first stack logic of the first protocol stack based at least in part on the timing delay to meet a link timing requirement of a link layer of the first protocol stack; and
    a dynamic random access memory (DRAM) coupled to the receiver.

15. The system of claim 14, wherein the receiver further includes a second protocol stack to handle data according to a second protocol, wherein the second protocol stack includes a second interface logic to alter timing of at least one second stack logic of the second protocol stack based at least in part on the timing delay.

16. The system of claim 15, wherein the tunneling physical layer includes a controller to select the first protocol stack or the second protocol stack to receive packets received from the transmitter.

17. The system of claim 14, wherein the first interface logic is to alter the timing by controlling the at least one first stack logic not to count an interval.

* * * * *